H. C. QUESENBERRY.
AUTOMATIC AIR BRAKE CONTROL.
APPLICATION FILED JAN. 30, 1922.

1,412,749.  Patented Apr. 11, 1922.

Inventor
H. C. Quesenberry
By
Attorneys

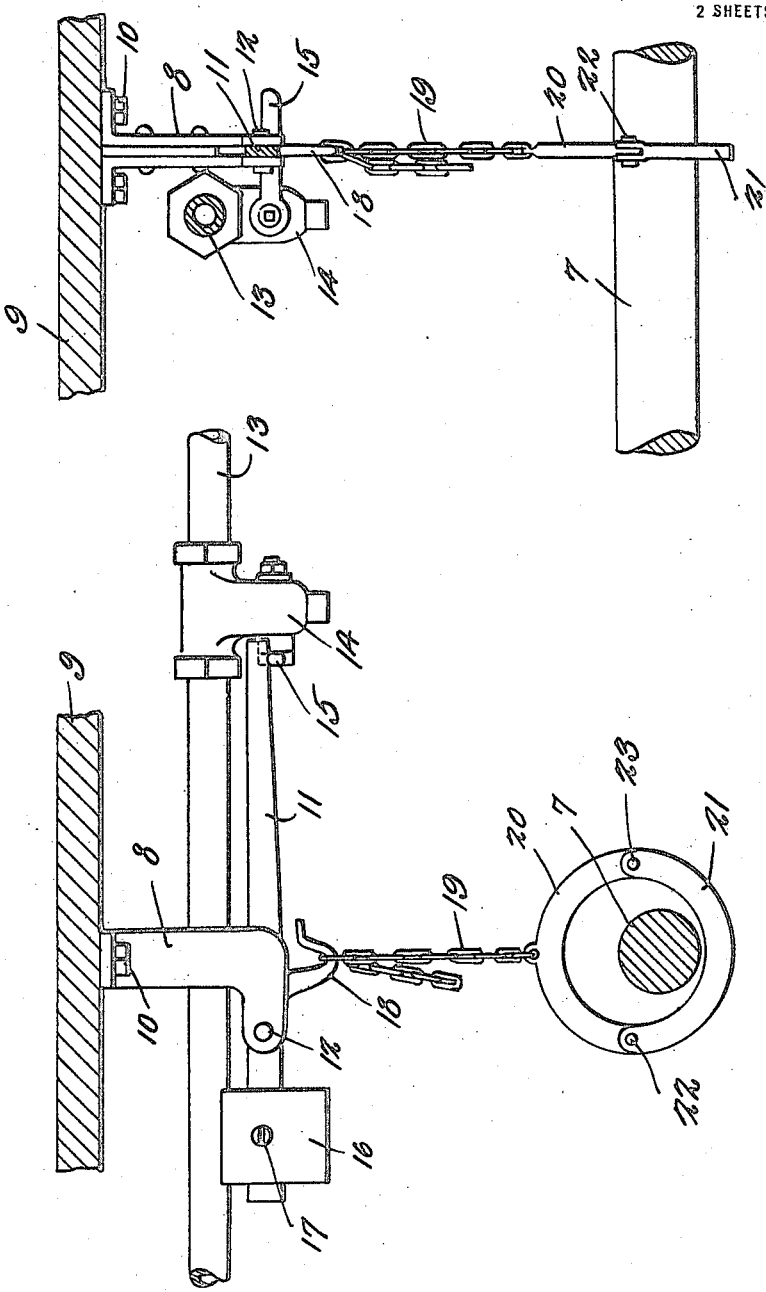

UNITED STATES PATENT OFFICE.

HENRY C. QUESENBERRY, OF DELTON, VIRGINIA.

AUTOMATIC AIR-BRAKE CONTROL.

1,412,749.  Specification of Letters Patent. Patented Apr. 11, 1922.

Application filed January 30, 1922. Serial No. 532,696.

*To all whom it may concern:*

Be it known that I, HENRY C. QUESENBERRY, a citizen of the United States, residing at Delton, in the county of Pulaski and State of Virginia, have invented a new and useful Automatic Air-Brake Control, of which the following is a specification.

This invention has reference to railway air brakes, and more particularly to a novel form of construction for automatically applying the air brakes when a car equipped with the device is derailed.

Another object of the invention is to provide a device of this character, which will be operated by the downward movement of the axle, thereby insuring a direct operation of the air brake controlling valve.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 2 is a side elevational view of the device, the axle and floor of the car being shown in section.

Figure 3 is a rear elevational view of the device, the controlling arm being shown in section.

Figure 1:
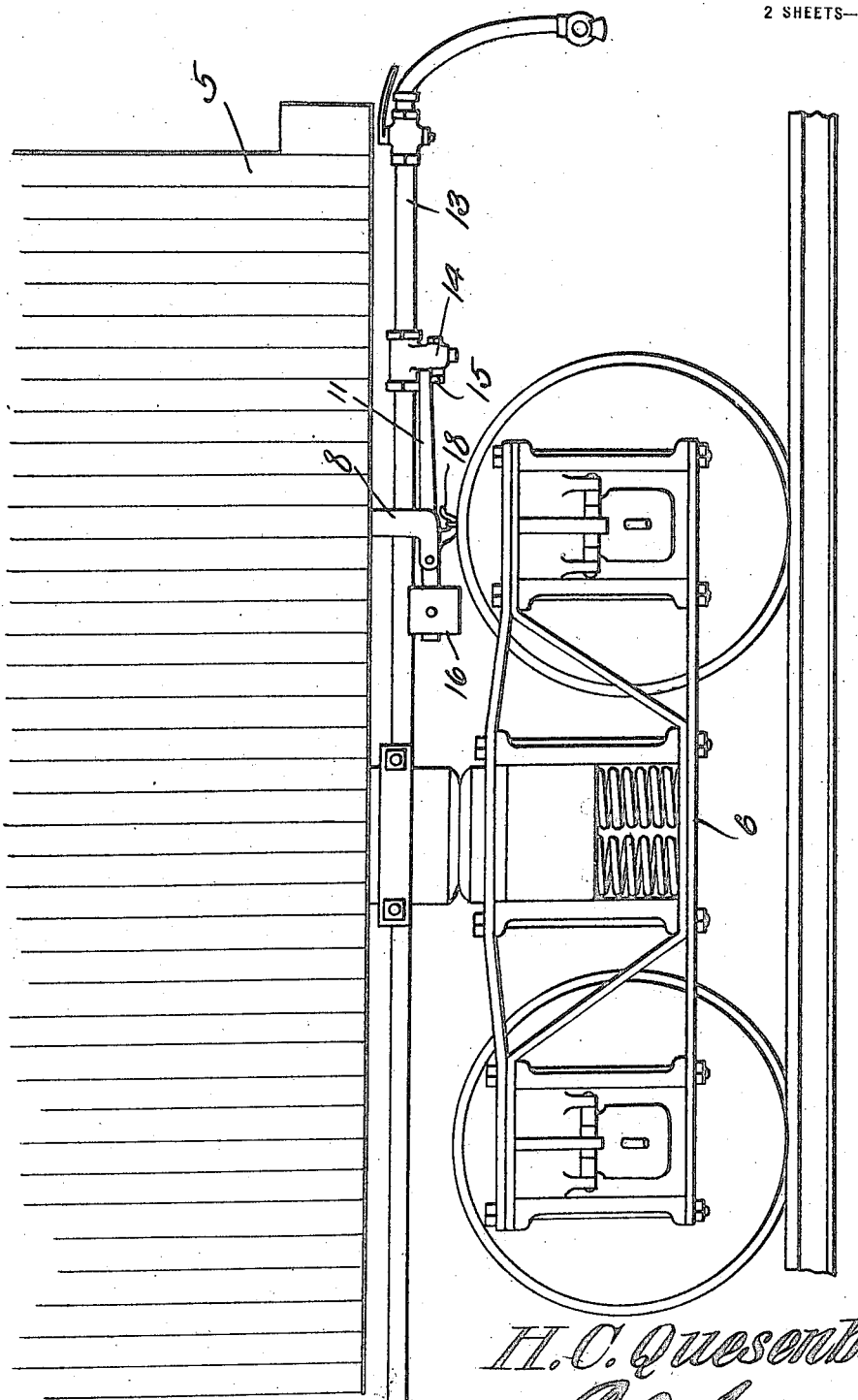
Figure 1 is a fragmental elevational view of a car disclosing the invention as applied thereto.

Referring to the drawings in detail, the reference character 5 designates the body portion of the car, the reference character 6 designating one of the trucks of the car, the same supporting the axles on which are mounted the wheels of the car, one of the axles being indicated at 7.

The device forming the essence of the invention includes a pair of depending arms 8 which are bolted to the under surface of the car floor 9 as by means of the bolts 10, the arms 8 being disposed in spaced relation with each other to provide a clearance for the controlling arm 11, which is pivotally supported therebetween as by means of the pivot pin 12.

The arms 8 extend rearwardly so that the pivot point of the arm 11 will not be in direct alignment with the axle 7, and arms 8. Supported by the car frame is the usual air-brake pipe 13 which is supplied with the rotatable valve member 14, which valve member is controlled by the movement of the arm 15, which is shown as connected thereto. Carried on one end of the arm 11 is an adjustable weight 16 made adjustable along the arm 11, as by means of the set screw 17 which is shown as extending through the weight 16, one end thereof contacting with the arm 11 to secure the weight against movement.

The forward end of the arm 11 normally engages the arm 15 of the valve proper, contacting with the upper surface of the arm, whereby downward movement of the arm 11 results in a downward movement of the arm 15, to open the valve 14 to cause the brakes to be applied.

Secured to the under surface of the arm 11, is a hook member 18, which hook member is disposed directly above the axle 7 and accommodates one link of the chain 19 which is shown as having connection with one section of the collar 20, the lower section of the collar 20 which is indicated at 21, has pivotal connection with the upper section, as at 22, whereby the collar may be positioned around the axle 7, the opposite end of the lower section 21 being secured to the upper section of the collar as at 23.

Thus it will be seen that should a wheel supported on one end of the axle 7, drop off of the rail, the chain 19 would be pulled downwardly, moving the forward portion of the arm 11 against the arm 15 to automatically cut off the air supply and apply the brakes.

Having thus described the invention, what is claimed as new is:—

1. In combination with the body and axle of a car, arms secured to the car, an air pipe having a valve, supported adjacent to the arms, an arm carried by the air valve, a controlling arm supported between the arms carried by the car, a collar supported around the axle, and means for connecting the collar and controlling arm, whereby downward movement of the collar will cause the controlling arm and valve arm to move to cut off the supply of air to the air pipe.

2. In combination with the axle and air brake pipe of a car, a valve member in the air brake pipe for controlling the passage of air therethrough, a pivoted controlling arm having a hook member, said pivoted controlling arm engaging the valve member, whereby movement of the controlling arm will produce a relative movement of the valve member, a collar encircling the axle, and adjustable means connecting the collar and hook member to cause the arm to move downwardly and operate the valve.

3. In combination with the axle and air brake pipe of a car, a valve member for controlling the passage of air through the air brake pipe, a pivoted arm having contact with the valve member, a collar encircling the axle, a hook member carried by the arm, and a chain connecting the collar and hook member, whereby downward movement of the collar will cause the controlling arm to operate the valve member.

In testimony that I claim the foregoing as my own, I have hereto affixed my signature in the presence of two witnesses.

HENRY C. QUESENBERRY.

Witnesses:
R. L. LINDSAY,
GLADISE WHITAKER.